United States Patent

[11] 3,577,857

| [72] | Inventors | Donald H. Schuster;<br>Russ S. Vaught, Ames, Iowa |
|---|---|---|
| [21] | Appl. No. | 772,082 |
| [22] | Filed | Oct. 31, 1968 |
| [45] | Patented | May 11, 1971 |
| [73] | Assignee | Iowa State University Research Foundation<br>Ames, Iowa |

[54] DRIVER TRAINER SIMULATOR HEAD UNIT
8 Claims, 6 Drawing Figs.

[52] U.S. Cl..................................................... 35/11,
2/15
[51] Int. Cl...................................................... G09b 9/02
[50] Field of Search........................................ 35/11, 12
(G), (Q), (E); 2/10, 15

[56] References Cited
UNITED STATES PATENTS
| 1,455,025 | 5/1923 | Kern-Jenny et al........... | 2/15X |
| 2,715,783 | 8/1955 | Chedister et al.............. | 35/11 |
| 3,237,205 | 3/1966 | Claudel........................ | 2/15 |
| 3,273,164 | 9/1966 | Thomas........................ | 2/10 |

*Primary Examiner*—Wm. H. Grieb
*Attorney*—Zarley, McKee & Thomte

ABSTRACT: A driver trainer unit having a head unit including a blinder operable between raised and lowered positions, a speaker operative with the blinder and actuated by a computer responsive to the driving actions of the student operating the driver trainer simulator in response to driving situations projected on a screen. A solenoid may be used to move the blinder between raised and lowered positions. A microphone may also be provided for receiving the audible responses from the student when reacting to a simulated crash situation.

Patented May 11, 1971

3,577,857

INVENTORS
DONALD H. SCHUSTER
RUSS S. VAUGHT
BY
Zarley, McKee & Thomte
ATTORNEYS

DRIVER TRAINER SIMULATOR HEAD UNIT

Driver-training simulators to be most effective must be as realistic as possible and thus if a crash situation is projected on the screen the student should be personally subjected to simulated crash conditions through audio and visual means. This includes crash sounds being transmitted to the student's ears and a blinder moving across the student's eyes. A microphone is provided to pick up the student's responses to the crash situation since these responses may very well be meaningful in evaluation the student's overall driving performance. The driving situation is made more realistic by the use of a crash-type protective helmet which covers a head frame bearing the microphone and speaker and blinder.

The crash conditions may be presented in accordance with a programmed driver-training film or may be caused by improper responses to driving situations presented on a driver-training film. Thus if the student makes proper responses to situations on the training film, the simulated crash conditions could be avoided and conversely improper responses would cause the computer to actuate the audio sound means to present the crash noises as well as actuate the blinder to cut off the student's vision as would be the case in an actual crash.

These and other features and advantages of this invention will become readily apparent to those skilled in the art upon reference to the following description when taken into consideration with the accompanying drawings, wherein.

Figures 1, 2, 3, 4, 5, 6:
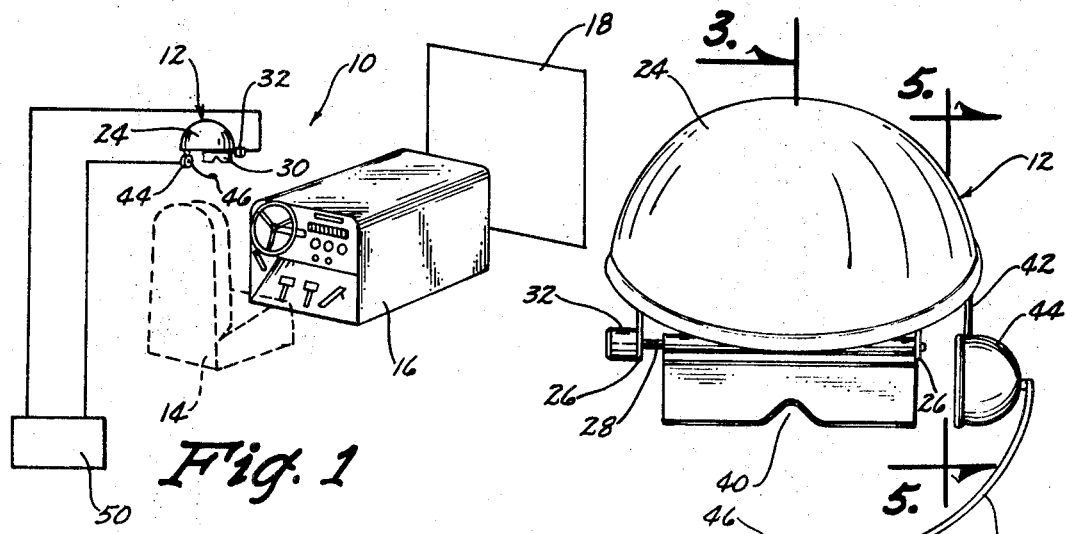
FIG. 1 is a perspective view of a driver trainer simulator unit including the head unit of this invention.
FIG. 2 is a front elevation view of the head unit.
FIG. 3 is a cross-sectional view taken along line 3–3 in FIG. 2.
FIG. 4 is a fragmentary cross-sectional view taken along line 4–4 in FIG. 3.
FIG. 5 is a fragmentary cross-sectional view taken along line 5–5 in FIG. 2.
FIG. 6 is a cross-sectional view taken along line 6–6 in FIG. 4.

The driver trainer simulator of this invention is generally referred to in FIG. 1 by the reference numeral 10 and includes a head unit 12 for the student to wear while sitting in a seat 14 in front of a simulator 16 and a projection screen 18.

The head unit 12 includes a head frame 20 connected through rivets 22 to a crash-type helmet 24 semispherical in shape.

A pair of downwardly extending elements 26 are provided along the forward side of the frame 20 and receive an elongated shaft 28 on which a blinder 30 is carried. A solenoid 32 is connected to the shaft 28 for rotating the blinder 30 from the dash line raised position of FIG. 3 to the downwardly extending blinding solid line position. Shaft 28 is provided with indentations 34 and a sleeve 36 carried thereon is crimped into the indentations 34 to hold the sleeve in place thereon. A downwardly extending flange 38 is provided on the sleeve 36 and a sheet of opaque plastic material is riveted thereto to provide the blinder 30. A nose notch 40 is cut into the blinder 30 in the center to matingly engage the wearer's nose.

The head frame 20 as seen in FIG. 5 also includes a pair of inwardly directed V-shaped springs 40 which slidably engage a pair of vertically oriented rods 42 carrying and ear speaker unit 44 thereon. It is seen that the speaker unit 44 may be adjusted vertically as desired between the spring 40. A microphone 46 is carried on an arm 48 pivotally connected to the back and center of the ear speaker 44 as seen in FIG. 2.

The solenoid 32 may be an Ledex rotary solenoid size 3 having a 67½° arc of travel.

In operation it is seen that the simulated crash helmet may be used several different ways in cooperation with the auto simulator 16. First, a preprogrammed film may be projected onto the screen 18 and be coupled through a computer 50 to the head unit 12 including the ear speaker 44 and the blinder solenoid 32 such that when a crash scene is presented on the film 18 the crash sounds will be transmitted to the student's ear and he will be blinded by actuation of the solenoid 32 which will turn the blinder 30 to the solid line position of FIG. 3. The student's responses will be received in the microphone 46 and fed back into the computer 50.

Alternatively, the student's reactions to the driving situations presented on the screen 18 may be fed into the computer 50 and upon certain incorrect responses being made by the student the simulated crash situation will result wherein the computer will actuate the ear speaker 44 and energize the solenoid 32 to turn the blinder 30 downwardly and additionally shut down the simulator 16 and the projection unit since the exercise is completed by virtue of a crash having occurred. This procedure will as closely as possible correspond to the actual driving conditions the student will encounter in driving on the highways since certain incorrect responses to different driving situations will cause a crash which results in the auto being stopped, the driver being blinded and being subjected to crash sounds.

Some changes may be made in the construction and arrangement of our driver trainer simulator head unit without departing from the real spirit and purpose of my invention, and it is my intention to cover by my claims, any modified forms of structure or use of mechanical equivalents which may be reasonably included within their scope.

We claim:

1. A driver trainer simulator head unit, comprising:
a frame for engaging a person's head,
a blinder on said frame for extending in front of the wearer's eyes at times in a blinding position,
power means for moving said blinder to a blinding position in front of the wearer's eyes,
a computer being operatively connected to said blinder power means for actuating said blinder to said blinding position, and
an audio speaker being secured to said frame and being adapted to be positioned at an ear of the wearer, and said computer being operatively connected to said speaker to transmit simulated crash sounds at approximately the time the power means is actuated to move said blinder to said blinding position.

2. The structure of claim 1 wherein said power means is an electrical solenoid and said blinder is carried on a rotatable shaft rotatably secured to said frame, said solenoid adapted to move said blinder between approximately horizontal and vertical positions.

3. The structure of claim 1 wherein said power means is an electrical solenoid and a protective helmet is secured to said frame for covering the wearer'head.

4. The structure of claim 1 wherein a microphone is carried on said frame and is adapted to be positioned adjacent said wearer's mouth to receive audible responses from the wearer upon said blinder being actuated to a blinding position and said crash sounds being transmitted to the wearer's ear.

5. The structure of claim 4 wherein a driver trainer simulator and visual screen are coordinated with said computer for the actuation of said blinder and the audio speaker.

6. The structure of claim 5 wherein projection means is provided for a showing a predetermined driving program on said screen and predetermined incorrect responses on said driver trainer simulator actuate said computer to actuate said blinder and said speaker.

7. The structure of claim 6 wherein said computer and said projection means are interconnected to stop said projection means upon said blinder and speaker being actuated by said computer.

8. The structure of claim 2 wherein a protective helmet is secured to said frame for covering the wearer's head, and said blinder is formed of opaque plastic.